United States Patent [19]

Laughlin

[11] 3,992,099

[45] Nov. 16, 1976

[54] SOURCE DISCRIMINATOR FOR MEASURING ANGLE OF ARRIVAL AND WAVELENGTH OF RADIANT ENERGY

[75] Inventor: Richard H. Laughlin, Richardson, Tex.

[73] Assignee: Varo, Inc., Garland, Tex.

[22] Filed: July 10, 1975

[21] Appl. No.: 594,756

Related U.S. Application Data

[63] Continuation of Ser. No. 424,059, Dec. 12, 1973, abandoned.

[52] U.S. Cl. ............................ 356/73; 250/203 R; 356/79; 356/141
[51] Int. Cl.² ........................................ G01N 21/22
[58] Field of Search ............... 250/203, 226, 237 G, 250/550; 350/162 R; 356/73, 79, 138, 141, 152

[56] References Cited

UNITED STATES PATENTS

| | | | |
|---|---|---|---|
| 3,137,794 | 6/1964 | Seward | 356/152 X |
| 3,435,246 | 3/1969 | Webb | 250/203 R |
| 3,469,102 | 9/1969 | Huvers | 356/152 X |
| 3,478,219 | 11/1969 | Nutz | 250/203 R X |
| 3,518,443 | 6/1970 | Engelmann | 250/203 R X |
| 3,541,338 | 11/1970 | Duda et al. | 356/152 X |
| 3,780,966 | 12/1973 | Newcomb, Jr. et al. | 250/203 R X |
| 3,781,110 | 12/1973 | Leitz et al. | 250/237 G X |
| 3,837,744 | 9/1974 | Egan et al. | 250/237 G X |
| 3,856,401 | 12/1974 | Heitmann et al. | 250/237 G X |

*Primary Examiner*—Paul L. Gensler
*Attorney, Agent, or Firm*—Olson, Trexler, Wolters, Bushnell & Fosse, Ltd.

[57] ABSTRACT

The embodiment of the invention disclosed herein is directed to an angle of arrival source discriminator for determining both the spectral content of incident radiant energy and for simultaneously determining the angle of arrival of said incident radiant energy. The discriminator system includes first and second planar detector means positioned adjacent one another and arranged to have their planar surfaces transversely positioned to one another. Connected to the planar detector means are signal receiving and indicating devices, such as ammeters, or the like, for producing output signals in response to the angle of incidence of radiant energy impinging upon the planar surfaces thereof. A diffraction grating is positioned adjacent the planar detector means and oriented substantially at 45° relative to the planar detector means so that signal information impinging on the planar detector means can be compared by analog or digital circuitry to determine both the angle of arrival of the radiant energy and the wavelength thereof.

5 Claims, 6 Drawing Figures

SOURCE DISCRIMINATOR FOR MEASURING ANGLE OF ARRIVAL AND WAVELENGTH OF RADIANT ENERGY

RELATED APPLICATION

This is a continuation application of U.S. Pat. application Ser. No. 424,059, filed Dec. 12, 1973, and now abandoned.

BACKGROUND OF THE INVENTION

This invention relates generally to spectrum analyzer systems, and more particularly to angle of arrival source discriminator systems for simultaneously determining both the angle of arrival and the wavelength of radiant energy having electromagnetic properties such as light, and the like.

BRIEF DESCRIPTION OF THE PRIOR ART

Heretofore, devices for detecting the direction from which a radiant energy source is received have been complicated and expensive mechanical devices having substantial numbers of moving parts. These complicated and expensive devices are somewhat critical in their adjustment and require substantial amounts of maintenance to insure their proper operation. Other devices for detecting the source of radiant energy may include such systems as X-ray spectography and the like.

Additional independent spectrum analysis systems are also provided which can determine the wavelength of the radiant energy source. Such systems as spectrum analyzers are well-known in the art and are used to determine the general characteristic of elements when bombarded with X-ray radiation or the like.

Therefore, for determining the direction from which a radiant source is located and for determining the wavelength of the particular radiant energy, two separate spectrum analyzer systems were required, one for wavelength and one for direction.

SUMMARY OF THE INVENTION

Accordingly, it is an object of this invention to overcome the disadvantages of the prior art by providing a single apparatus to determine the spectral characteristics of radiant energy such as direction of the source and its wavelength, as well as the location of the source of radiation.

Another object of this invention is to provide an angle of arrival source discriminator system for determining the spectral content of incident radiant energy and for simultaneously determining the angle of arrival of the incident radiant energy without the utilization of moving parts within the system.

Many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENTS

Figure 1:
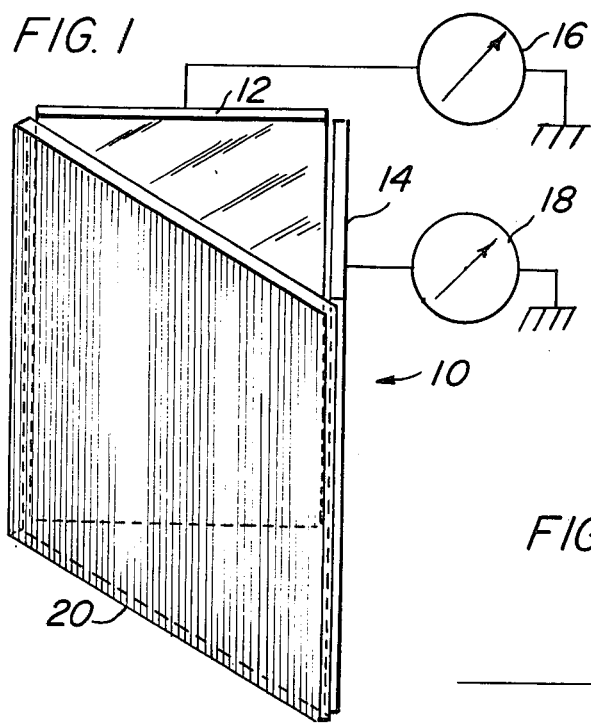
FIG. 1 is a diagrammatic representation of a source discriminator utilizing a pair of planar detectors and a diffraction grating co-operable therewith in accordance with the principles of this invention.
Figure 2:
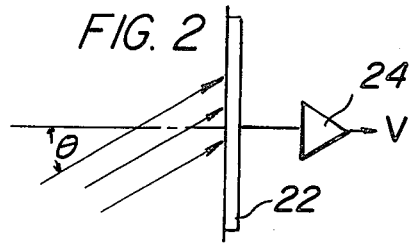
FIG. 2 illustrates a planar detector utilized in accordance with the principles of this invention.

Referring now to FIG. 1, there is seen a general schematic diagram of the basic form of an angle-of-arrival source discriminator for determining the spectral content of incident radiant energy and for simultaneously determining the angle of arrival of the radiant energy, and is here designated generally by reference numeral 10. The source discriminator 10 includes first and second planar detector elements 12 and 14 positioned adjacent one another and arranged to have their surfaces transversely oriented relative to one another. In the illustrated embodiment the planar detectors 12 and 14 have their planar surfaces oriented at approximately right angles to one another. However, it will be understood that the angle between the planar detectors may be from between 10 to 170 degrees more or less. Connected to the output of the planar detectors 12 and 14 are signal receiving means 16 and 18, respectively, for producing output signals in response to the angle of incidence of radiant energy impinging upon the planar surfaces. The signal output from the signal receiving indicators, here being ammeters, will produce currents $I_1$ and $I_2$ from the meters 16 and 18, respectively, which will then be utilized to determine the angle and wavelength of the radiant energy. In the illustrated embodiment the angle $\theta$ will be seen to correspond to Arc Sin $$\frac{(I_1 - I_2)}{k}$$

where $k$ is the grating constant, and the wavelength $\lambda$ is equal to $f(I_1 + I_2, \theta)$. This will be shown in greater detail hereinbelow. It will be noted that the complexity of the equations increase as the angle between the planar detectors and the grating changes from its symmetrical configuration.

Most advantageously, a diffraction grating 20 is positioned adjacent the planar detectors 12 and 14, here being illustrated at about 45° relative to one another so that the angular relationship of the diffraction grating 20 with regard to the planar detectors 12 and 14 is approximately the same. The basic apparatus illustrated in FIG. 1 is capable of determining both the angle of arrival of a source of radiant energy as well as the wavelength of the electromagnetic radiation associated therewith. While ammeters 16 and 18 are illustrated herein for the basic concept, it will be understood that the signal receiving means may take other forms, as for example, oscilloscopes or analog and digital computer equipment to operate on the appropriate signal information.

For a better understanding of the theoretical aspects of the invention, the following explanation is taken in conjunction with reference to FIGS. 2–6 for the basic mathematical derivatives involved of the special case shown.

The angle of arrival source discriminator 10 has many potential configurations. Some of the configurations will result in simple straightforward solutions for wavelength and angle outputs, which will be compatible with analog processing. These solutions are simplified due to trigonometric symmetry. Other configurations will result in more involved mathematical relations; however, these will require only simple digital processing.

Figure 3:
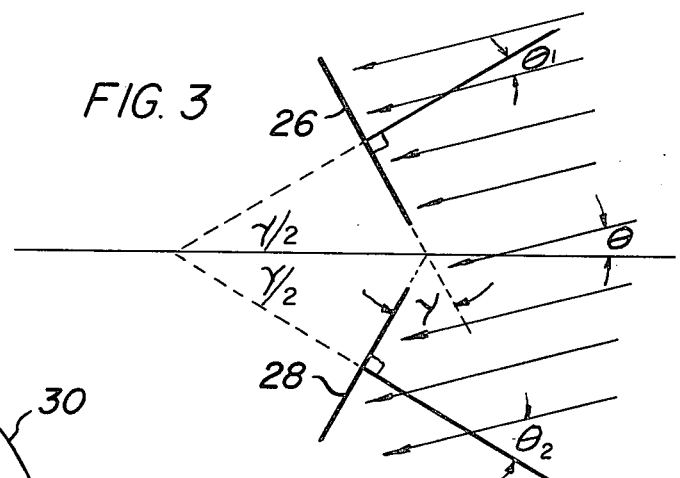
FIG. 3 illustrates the angular relationship between incident flux of radiant energy and the planar detectors which are utilized in accordance with the principles of this invention.
Figure 4:
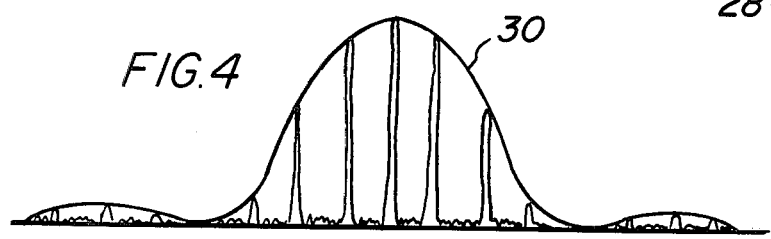
FIG. 4 illustrates the relative intensity of grating-transformed plane waves.

The performance of the angle of arrival source discriminator 10 can be defined in terms of the grating equation, Lambert's law and algebraic and trigonometric functions of the detector outputs. The response of a planar detector to incident radiation is a function of the radiation amplitude, wavelength and angle of incidence. Using a detector such as a silicon diode 22 shown in FIG. 2, the output voltage delivered to an operational amplifier 24 can be defined as $V = AIS \cos \theta$ where:
- $A$ = the detector area
- $I$ = the incident flux
- $S$ = the detector response
- $\theta$ = angle of flux incident upon the detector The Cos law defines the reduced effective area of the detector as a result of angles of incidences. It has been previously demonstrated that the angle of arrival of a plane wave can be determined through the use of two planar detectors 26 and 28. When two planar detectors are arranged as shown in FIG. 3, such that their adjacent edges are parallel and their normals at a given angle, $\lambda$, from one another, the angle of arrival can be processed from the resulting detector signals. The angle of arrival, $\theta_1$, at the first detector 26 is $$\theta_1 = \theta - \frac{\gamma}{2} \qquad (2)$$

and the angle of arrival, $\theta_2$, at the second detector 28 is $$\theta_2 = \theta + \frac{\gamma}{2} \qquad (3)$$

These relationships are valid for all arguments of $\lambda$.

Taking the differential voltage between the first and second detectors 26 and 28, it is found that a voltage $V_\theta$ can be defined as a function of the angle of the incident radiation, where $$V_\theta = V_1 - V_2 = AIS \cos \theta_1 - AIS \cos \theta_2 \qquad (4)$$

substituting equations 2 and 3, $$V_\theta = V_1 - V_2 = AIS_\lambda \left[ \cos(\theta - \frac{\gamma}{2}) - \cos(\theta + \frac{\gamma}{2}) \right] \qquad (5)$$

by trigonometric identities
$$\cos(A - B) - \cos(A + B) = 2 \sin A \sin B \qquad (6)$$

substituting equation 6 into 4

$$V_\theta = V_1 - V_2 = 2 AIS_\lambda \sin \theta \sin \frac{\gamma}{2} \qquad (7)$$

It is of interest to determine the effect of placing a grating in the path of the incident plane wave prior to its arrival at the planar detectors. Since there are no lenses in the system, a plane wave incident upon a grating generates a series of plane waves leaving the grating at different angles and various amplitudes. These angles are shown as the zero, first, second, etc., orders of diffraction. The zero order is of the same angle as the incident wave but somewhat reduced in amplitude.

A plane wave in the optical space domain, incident upon a grating, is analogous to a series of pulses in the electrical time domain. The resulting plane waves leaving the grating are then analogous to the Fourier spectrum of the pulses. The Fourier transform performed upon the plane wave by the grating is defined as $$C_n I = \left[ \frac{\sin(N\pi d p/\lambda)}{N \sin(\pi d p/\lambda)} \right]^2 \times \left[ \frac{\sin(\pi S p/\lambda)}{\pi S p/\lambda} \right]^2 \qquad (8)$$

where:
- $N$ = integers $-n, o + n$, order of spectra
- $d$ = split spacing
- $S$ = slit width
- $P = \sin \phi - \sin \theta$
- $\theta$ = angle of incidence
- $\phi$ = angle of departure The first term of the equation determines where the maxima occur and the sharpness of the peaks. The peaks occur for $$p = \sin \phi - \sin \theta = \frac{N\lambda}{d} \qquad (9)$$

Rearranging the above equation results in the familiar grating equation $$\phi = \text{Arc Sin} (\sin\theta \pm Nk\lambda) \qquad (10)$$

where:
- $k$ is the grating constant

The relative amplitude of waves is defined by the second term of the expression. A typical transform wave 30 is plotted in FIG. 4. For purpose of simplicity, only $N = 0, +1, -1$ will be considered. It can be shown that in the following problems that in part of the equations the same results are obtained when the equations are summed over all values of N. In the equations in which this does not hold, it can be shown that the additional orders have negligible effect.

Figure 5:
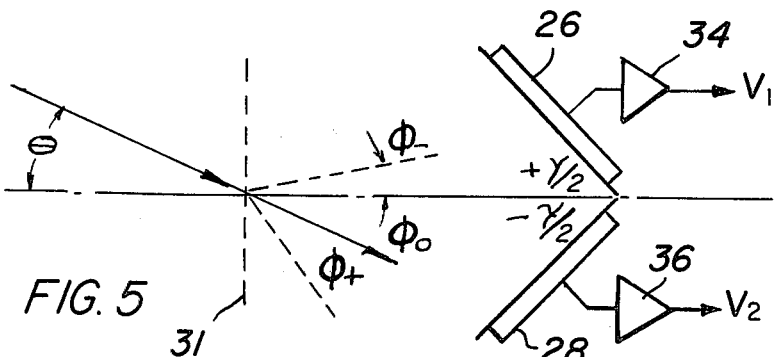
FIG. 5 is a diagrammatic representation of the angular relationship of diffracted beams and planar detectors.

The remaining problem is to combine the effect of the grating and detectors as shown in FIG. 5 and extract the wavelength information. Here the grating is designated by reference numeral 31 and a pair of operational amplifiers are designated by reference numerals 34 and 36.

Taking the case of $N = 0, +1, -1$ inserting in equation 10, it is found $$\phi_n = \text{Arc Sin} (\sin \theta) = \theta \qquad (11)$$

$$\phi_+ = \text{Arc Sin} (\sin \theta + k\lambda) \qquad (12)$$

$$\phi_- = \text{Arc Sin} (\sin \theta - k\lambda) \qquad (13)$$

-continued $$M = \frac{V_1 + V_2}{2AIS \cos \frac{\gamma}{2}}$$

$$N = C_o \cos \theta$$

$$F = 4\cos^2\theta - (\frac{V_1 + V_2}{2AIS \cos \frac{\gamma}{2}} - C_o \cos\theta)^2$$

$$G = 4\sin^2\theta + (\frac{V_1 + V_2}{2AIS \cos \frac{\gamma}{2}} - C_o \cos\theta)^2$$

The above equation defines $\lambda$ in terms of measured values of constants.

$V_1$ and $V_2$ are direct outputs of the detectors, $\theta$ is the angle processed from $V_1 - V_2$ and $C_1$, $k$, $C_o \cos \lambda/2$ are all measured constants. The value AIS is either measured with a special detector or is processed by comparing the values derived with an orthogonal angle of arrival source discriminator.

Figure 6:
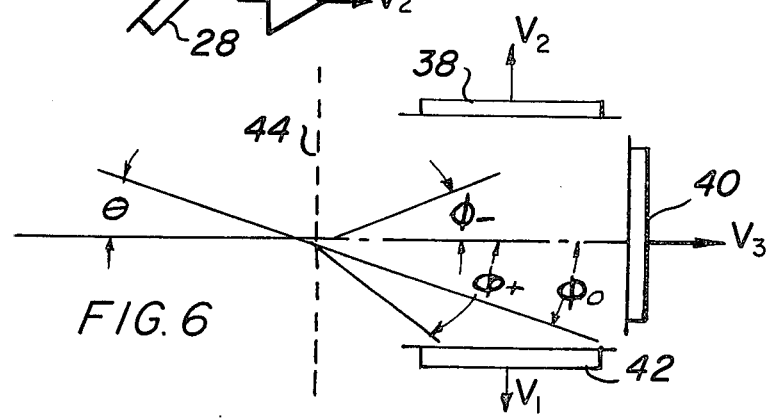
FIG. 6 illustrates a parallel detector configuration of the present invention.

A specific case of the detector configuration, shown in FIG. 6, is attractive due to the simplicity of the solution. This is the case of parallel detectors $\lambda = 180$ degrees as shown in FIG. 6 where there are three planar detectors 38, 40 and 42, and a grating 44.

When $\phi$ is positive, the signal appears only at the output of the $V_1$ and $V_3$, and when $\phi$ is negative, the signal appears only at the output of $V_2$ and $V_3$. When $\phi = O$, the signal appears at $V_3$ only. However, the transform performed by the grating assures that there will always be at least two beams with angles different from zero.

The amplitude (V) of the signal from the detector is $$V_1 = AIS \cos (\theta - \pi/2) \quad (39)$$

$$= AIS \sin \theta \quad (40)$$

$$V_2 = AIS \cos (\theta + \pi/2) \quad (41)$$

whereas before:

$$\sin \phi_n = \sin \theta \quad (10)$$

$$\sin \phi^+ = \sin \theta + k\lambda \quad (11)$$

$$\sin \phi^- = \sin \theta - k\lambda$$

The first case treated will be for angles ($\theta$) greater than zero ($\theta$ positive) where:

$$V_1 = AIS (C_o \sin \phi_o + C_1 \sin \phi^+) \quad (42)$$

$$V_2 = AIS (-C_1 \sin \phi^-) \quad (43)$$

$$V_\lambda = V_1 + V_2 = AIS [C_o \sin \phi_o + C_1 (\sin \phi^+ - \sin \phi^-)] \quad (44)$$

The second case is that of angles ($\theta$) less than zero, where:

$$V_1 = AIS\, C_1 \sin \phi^+ \quad (45)$$

$$V_2 = -AIS [C_o \sin \phi_o + C_1 \sin \phi^-] \quad (46)$$

$$V_\lambda = V_1 + V_2 = -AIS [C_o \sin \phi_0 + C_1 (\sin \phi^- - \sin \phi^+)] \quad (47)$$

The solution to equations 44 and 47 is:

$$\frac{V_\lambda}{AIS} - C_o \sin\theta = C_1 (\sin\theta + k\lambda - \sin\theta - k\lambda) \quad (48)$$

$$\frac{V_1 + V_2}{AIS} - C_o \sin\theta = 2 C_1 k\lambda \quad (49)$$

-continued $$\lambda = \frac{1}{2 C_1 k} (\frac{V_1 + V_2}{AIS} - C_o \sin\theta) \quad (50)$$

$$\frac{V_\lambda}{AIS} + C_o \sin\theta = C_1 (\sin\theta + k\lambda - \sin\theta + k\lambda) \quad (51)$$

$$\lambda = \frac{1}{2 C_1 k} (\frac{V_1 + V_2}{AIS} + C_o \sin\theta) \quad (52)$$

The only difference in equations 50 and 52 is the sign of the value $\pm C_o \sin \theta$. Since the value of AIS $\sin \theta$ will be taken from $V_1 - V_3$ or $V_2 - V_3$ depending on whether the value of $\theta$ is positive or negative, the switching of the sign can be accomplished when switching between detector pairs.

What has been described is a new method and apparatus for simultaneously determining the spectral content of incident radiant energy and the angle of arrival of said incident radiant energy. According, variations and modifications may be effected without departing from the spirit and scope of the novel concepts disclosed and claimed herein.

The invention is claimed as follows:

1. A source discriminator for measuring both the angle of arrival and wavelength of plane wave radiant energy which is radiated by a source and incident upon said discriminator from an unknown direction and at an unknown wavelength, comprising in combination: first and second detector means each having planar detector surfaces transversely oriented with respect to each other at a predetermined angle for receiving plane wave radiant energy and converting it into corresponding electrical output signals each having a value corresponding to the angle of arrival of the plane wave radiant energy impinged upon its respective detector surface; diffraction grating means positioned optically between said plane wave source and said plane detector surface for providing at least two diffracted plane waves from the source of plane wave radiant energy being detected, one of said diffracted plane waves being the zero order of diffraction corresponding to the angle of arrival and the other of said diffracted plane waves being an nth order of diffraction angularly displaced from said zero order by an amount indicative of the wavelength of said source of plane wave radiant energy, and indicator means responsive to said electrical signal corresponding to said nth order of diffraction to provide an indication of the wavelength of said incident radiant energy, and responsive to said electrical signal corresponding to said zero order diffraction to provide an indication of the angle of arrival of said incident radiant energy, whereby said source discriminator simultaneously provides information as to both the angle of arrival and the wavelength of the incident radiant energy.

2. A source discriminator for radiant energy as set forth in claim 1, wherein said first and second detector means are positioned to have their detector surfaces at an angle of between 10° and 170° relative to one another.

3. A source discriminator for radiant energy as set forth in claim 2, wherein the plane of said diffraction grating means is positioned relative to the planes of said first and second detector means at equal angles to said planar detector surfaces thereof.

4. A source discriminator for radiant energy as set forth in claim 1, wherein said indicator means is re- Since these are linear functions, the effect of the three waves simultaneously incident upon the detectors is the algebraic sum of each wave incident upon the detector. The amplitude of the zero order will be defined as $C_o I$ and the amplitude of the $\pm 1$ order will be defined as $C_1 I$. By substituting equations 11-13 into equation 7

$$V_\theta = V_1 - V_2 = 2 AIS \sin \tfrac{\gamma}{2} [C_o \sin \theta + C_1 (\sin \theta + k\lambda + \sin \theta - k\lambda)] \quad (14)$$

$$V_\theta = 2 AIS \sin \tfrac{\gamma}{2} \sin \theta (C_o + 2 C_1) \quad (15)$$

Note: Over all orders of
$N \sin \theta (C_o + 2 C_1 + \ldots + 2 C_n)$.

From equation 15, it can be seen that the only effect of the grating on the angle function voltage $V_\theta$ in the differential mode is an attenuation factor.

The second case of interest is the sum of the voltages from the first and second detector. Using equations 2 and 3 in equation 1

$$V_1 = AIS_\lambda \cos(\theta - \tfrac{\gamma}{2}) \quad (16)$$

and $$V_2 = AIS_\lambda \cos(\theta + \tfrac{\gamma}{2}) \quad (17)$$

By transforming the incident plane wave (using equations 11, 12 and 13) and summing $V_1$ with $V_2$ $$V_\lambda = V_1 + V_2 = AIS [C_o (\cos(\phi_o + \tfrac{\gamma}{2}) + \cos(\phi_o - \tfrac{\gamma}{2})) + C_1 (\cos(\phi_+ + \tfrac{\gamma}{2}) + \cos(\phi_+ - \tfrac{\gamma}{2}) + \cos(\phi_- + \tfrac{\gamma}{2}) + \cos(\phi_- - \tfrac{\gamma}{2}))] \quad (18)$$

By trigonometric identities $$\cos(A+B) + \cos(A-B) = 2 \cos A \cos B \quad (19)$$

$$V_\lambda = V_1 + V_2 = 2 AIS \cos \tfrac{\gamma}{2} [C_o \cos \phi_o + C_1 \cos \phi_+ + C_1 \cos \phi_-] \quad (20)$$

$$\frac{V_\lambda}{2 AIS \cos \tfrac{\gamma}{2}} = C_o \cos \theta + C_1 \cos \phi_+ + C_1 \cos \phi_- \quad (21)$$

By trigonometric identities
$$\cos \phi = \sqrt{1 - \sin^2 \phi} \quad (22)$$

$$\frac{V_\lambda}{2 AIS_\lambda \cos \tfrac{\gamma}{2}} - C_o \cos \theta = C_1 (\sqrt{1 - \sin^2 \phi_+} + \sqrt{1 - \sin^2 \phi_-}) \quad (23)$$

From equations 12 and 13
$$\sin \phi^+ = \sin \theta + k\lambda \quad (12)$$
$$\sin \phi^- = \sin \theta - k\lambda \quad (13)$$

Let:
$$\sin \phi^+ = a + x \quad (24)$$
$$\sin \phi^- = a - x \quad (25)$$
$$\cos \theta = b \quad (26)$$

$$\frac{V_\lambda}{C_1 2 AIS \cos \tfrac{\gamma}{2}} - \frac{C_o b}{C_1} = e$$

Then:
$$e = \sqrt{1-(a+x)^2} + \sqrt{1-(a-x)^2} \quad (27)$$

$$e = \sqrt{1-a^2-x^2-2ax} + \sqrt{1-a^2-x^2+2ax} \quad (28)$$

$$e = \sqrt{b^2 - 2ax - x^2} + \sqrt{b^2 + 2ax - x^2} \quad (29)$$

$$e^2 = 2b^2 - 2x^2 + 2\sqrt{(b^2-2ax-x^2)(b^2+2ax-x^2)} \quad (30)$$

$$\frac{e^2}{2} - b^2 + x^2 = \sqrt{b^4 + x^4 - 2x^2 b^2 - 4a^2 x^2} \quad (31)$$

$$[\frac{e^2}{2} + (x^2 - b^2)]^2 = b^4 + x^4 - 2x^2 b^2 - 4a^2 x^2 \quad (32)$$

$$\frac{e^4}{4} + x^4 + b^4 - 2x^2 b^2 + e^2(x^2 - b^2) = b^4 + x^4 - 2x^2 b^2 - 4a^2 x^2 \quad (33)$$

$$\frac{e^4}{4} + e^2(x^2 - b^2) = -4a^2 x^2 \quad (34)$$

By gathering terms in $x^2$ $$(e^2 + 4a^2) x^2 = e^2 b^2 - \frac{e^4}{4} = e^2(b^2 - \frac{e^2}{4}) \quad (35)$$

$$x^2 = \frac{e^2}{4} \cdot \frac{(4b^2 - e^2)}{(4a^2 + e^2)} \quad (36)$$

and solving for $x$ $$k\lambda = x = \frac{e}{2} \sqrt{\frac{4b^2 - e^2}{4a^2 + e^2}} \quad (37)$$

$$\lambda = \frac{L \times (M - N) \times \sqrt{F}}{\sqrt{G}} \quad (38)$$

Where:

$$L = \frac{1}{2 C_1 k}$$

sponsive to the amplitude of current produced by said detector means.

5. A source discriminator system for measuring both the angle of arrival and wavelength of plane wave radiant energy which is radiated by a source and incident upon said discriminator from an unknown direction and at an unknown wavelength, said system comprising in combination: diffraction grating means positioned in said system to diffract said incident plane wave radiant energy into at least two diffracted plane waves, the first of said diffracted plane waves corresponding to a first order of diffraction and the second of said diffracted plane waves corresponding to a second order of diffracton; first and second planar detector means respectively responsive to said diffracted plane waves for producing corresponding first and second electrical output signals and indicator means responsive to said first and second output signals to indicate the angle of arrival and the wavelength of said incident plane wave radiant energy.

* * * * *

UNITED STATES PATENT OFFICE
CERTIFICATE OF CORRECTION

Patent No. 3,992,099    Dated November 16, 1976

Inventor(s) Richard H. Laughlin

It is certified that error appears in the above-identified patent and that said Letters Patent are hereby corrected as shown below:

Col. 2, line 46, "wavelength $\lambda$" should be --wavelength $\gamma$--

Col. 3, line 2, "derivitives" should be --derivations--

Col. 3, line 36, "angle $\lambda$" should be --angle $\gamma$--

Col. 3, line 50, "$\lambda$" should be --$\gamma$--

Col. 7, line 18, "Cos $\lambda/2$" should be --Cos $\dfrac{\gamma}{2}$--

Col. 7, line 25, "$\lambda = 180$" should be --$\gamma = 180$--

Col. 7, line 44, "Sin $\phi^+$" should be --Sin $\phi_+$--

Col. 7, line 45, "Sin $\phi^-$" should be --Sin $\phi_-$--

Col. 7, line 49, "$\phi^+$" should be --$\phi_+$--

Col. 7, line 51, "$\phi^-$" should be --$\phi_-$--

Col. 7, line 52, "Sin $\phi^+$" should be --Sin $\phi_+$--

UNITED STATES PATENT OFFICE
CERTIFICATE OF CORRECTION

Patent No. 3,992,099                     Dated November 16, 1976

Inventor(s) Richard H. Laughlin

It is certified that error appears in the above-identified patent and that said Letters Patent are hereby corrected as shown below:

Col. 7, line 53, " $\phi^-$ " should be -- $\phi_-$ --

Col. 8, line 19, "according" should be --accordingly--

Signed and Sealed this

Sixth Day of December 1977

[SEAL]

Attest:

RUTH C. MASON
Attesting Officer

LUTRELLE F. PARKER
Acting Commissioner of Patents and Trademarks